United States Patent [19]

Stearns

[11] E Re. 31,337

[45] Reissued Aug. 9, 1983

[54] VEHICLE BRAKE SYSTEM

[75] Inventor: George W. Stearns, Florissant, Mo.

[73] Assignee: Echlin Inc., Branford, Conn.

[21] Appl. No.: 946,491

[22] Filed: Sep. 28, 1978

Related U.S. Patent Documents

Reissue of:

[64] Patent No.: 3,992,064
Issued: Nov. 16, 1976
Appl. No.: 637,644
Filed: Dec. 4, 1975

U.S. Applications:

[62] Division of Ser. No. 903,886, May 8, 1978.

[51] Int. Cl.[3] ..... B60T 13/28

[52] U.S. Cl. ..... 303/7

[58] Field of Search ..... 303/7, 9, 13, 26, 29, 303/63, 64, 85

[56] References Cited

U.S. PATENT DOCUMENTS

| | | | |
|---|---|---|---|
| 3,173,726 | 3/1965 | Valentine et al. | 303/9 |
| 3,279,865 | 10/1966 | Bohn | 303/85 X |
| 3,862,782 | 1/1975 | Horowitz et al. | 303/40 |
| 3,863,992 | 2/1975 | Kurke et al. | 303/9 |
| 3,947,072 | 3/1976 | Plantan | 303/13 |
| 4,017,125 | 4/1977 | Durling | 303/7 |

OTHER PUBLICATIONS

*School Bus Piping*, Sealed Air Brakes, Inc., City of Industry, Calif., Dec. 31, 1966, Specification, Mack Dual Circuit Air Brake System, No. 2-73, MOS-122-T.

Specification, International Truck Brake System.

Specification, Bendix-Westinghouse Dual Air Brake System.

Air Brake, W Series, 1975 Ford Truck Specification, pp. 179, 180.

Specification, Berg 1974, Air Brake System for 6×4 Tractors.

Specification, Berg 1974, Air Brake System for Semi--Trailers.

Specification, FMV SS 121, Midland, Tractor-Trailer Air Brake System Power Controls Division, Midland Ross Corp., 1973.

*Primary Examiner*—Duane A. Reger

*Attorney, Agent, or Firm*—Neuman, Williams, Anderson & Olson

[57] ABSTRACT

A multi-axle vehicle brake system includes an air receiving portion, a valve portion, an air storage portion and a brake portion. The air receiving portion receives air from a supply source. The valve portion is connected to the air receiving portion. The storage portion includes a plurality of storage reservoirs connected for receiving air from and communicating air to the valve portion. The brake portion includes service and parking brake actuating chambers mounted on each end of each axle. Certain ones of the service brake actuating chambers are connected for receiving air from one of the storage reservoirs. Others of the service brake actuating chambers are connected for receiving air from another of the storage reservoirs. Each of the parking brake actuating chambers are connected for receiving air from either of the storage reservoirs.

5 Claims, 5 Drawing Figures

VEHICLE BRAKE SYSTEM

Matter enclosed in heavy brackets [ ] appears in the original patent but forms no part of this reissue specification; matter printed in italics indicates the additions made by reissue.

*This is a division of reissue application serial no.* 903,886, *filed May* 8, 1978 *which is, in turn, a reissue of U.S. Patent* 3,992,064 *filed Nov.* 16, 1976.

BACKGROUND OF THE INVENTION

1. FIELD OF THE INVENTION

This invention relates generally to fluid handling and more particularly to fluid handling processes involving pressure control.

2. DISCUSSION OF THE PRIOR ART

Presently, air brake systems for towed vehicles generally comprise two arrangements. First, there is the type of system utilizing a single service reservoir for providing a source of pressurized air to all the service brake chambers and a single emergency or parking reservoir for supplying pressurized air to all the parking brake chambers. Second, there is the type of system utilizing more than one service reservoir each providing a souce of air for operating some of the service brake chambers and a single parking reservoir for supplying pressurized air to all the parking brake chambers.

In the first type of system, should a failure occur in that system such as a depletion of air pressure in the service reservoir through leakage or otherwise, there is no available air pressure for communication with the service brake chambers thus rendering those brakes inoperative. Also, should a failure occur in the first system parking reservoir through leakage or otherwise, the resultant loss of air pressure communicating with the parking brake chamber would cause an undesirable automatic application of the parking brakes and also prevent subsequent release of the applied brakes.

In the second type of system, there is a slight advantage over the first system in that, should a failure occur in the second system such as a depletion of air pressure in one of the two service reservoirs, there would still be some air pressure available in the other of the two service reservoirs for communication with some of the service brake chambers to effect partial braking. However, should a failure occur in the single parking reservoir, the resultant loss of air pressure communicating with the parking brake chambers would cause the abovementioned undesirable automatic application of the parking brakes. It would therefore be of benefit to have a service and parking brake system offering more than single service reservoir capability to provide at least partial service braking in the event of failure in one of the service systems and also offering more than single parking reservoir capability so that, in the event of failure in one of the parking reservoirs, there would still be air pressure communication with the parking brake chamber to prevent the undesirable automatic application of the parking brakes.

SUMMARY OF THE INVENTION

Accordingly, the present invention includes a service and parking brake system preferably for towed vehicles such as trailers used in a tractor-trailer combination having plural service reservoir capability to provide at least partial service braking in the event of failure in one of the service systems and also having plural parking reservoir capability, so that in the event of failure in one or more of the parking reservoirs, there will still be air pressure retained in the parking brake chambers to prevent the undesirable automatic application of the parking brakes. The foregoing is accomplished by providing a vehicle service and parking brake system including an air receiving portion, a valve portion, an air storage portion and a brake portion. The air receiving portion receives air from a supply source. The valve portion is connected to the air receiving portion and includes a first plurality of like valve members separated for independently operating on the air received and for securing the air operated on from returning to the receiving portion. The storage portion is connected to the valve portion and includes a plurality of storage reservoirs for independently receiving the air from the first plurality of like valve members, respectively, and for storing the air received. A second plurality of like valve means, corresponding to the first valve means, are separated in the valve portion and cooperatingly connected to the separated storage reservoirs, respectively, for selecting air from one of the reservoirs and for securing the selected air from passing to another of the reservoirs. A brake portion includes service brake chambers, ones of which are connected for receiving air from one of the storage reservoirs, others of which are connected for receiving air from another of the storage reservoirs and also includes parking brake chambers connected for receiving the selected air from the storage reservoirs.

Other advantages and novel features of this invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
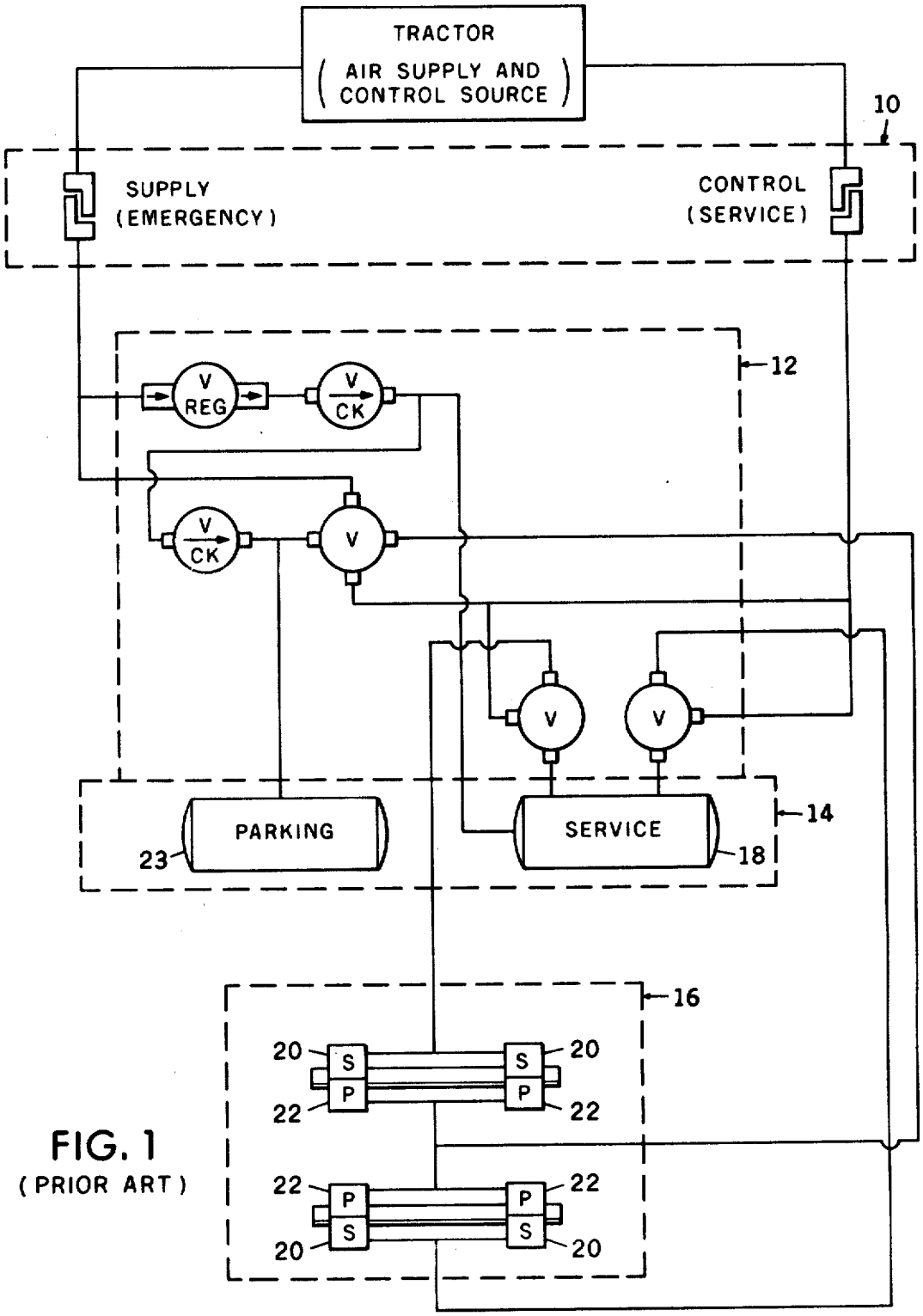
FIG. 1 (PRIOR ART)
FIG. 1 diagrammatically illustrates a prior art tandem axle vehicle brake system utilizing one service reservoir communicating air with the service brake chambers and one parking reservoir, communicating air with the parking brake chambers.
Figure 2:
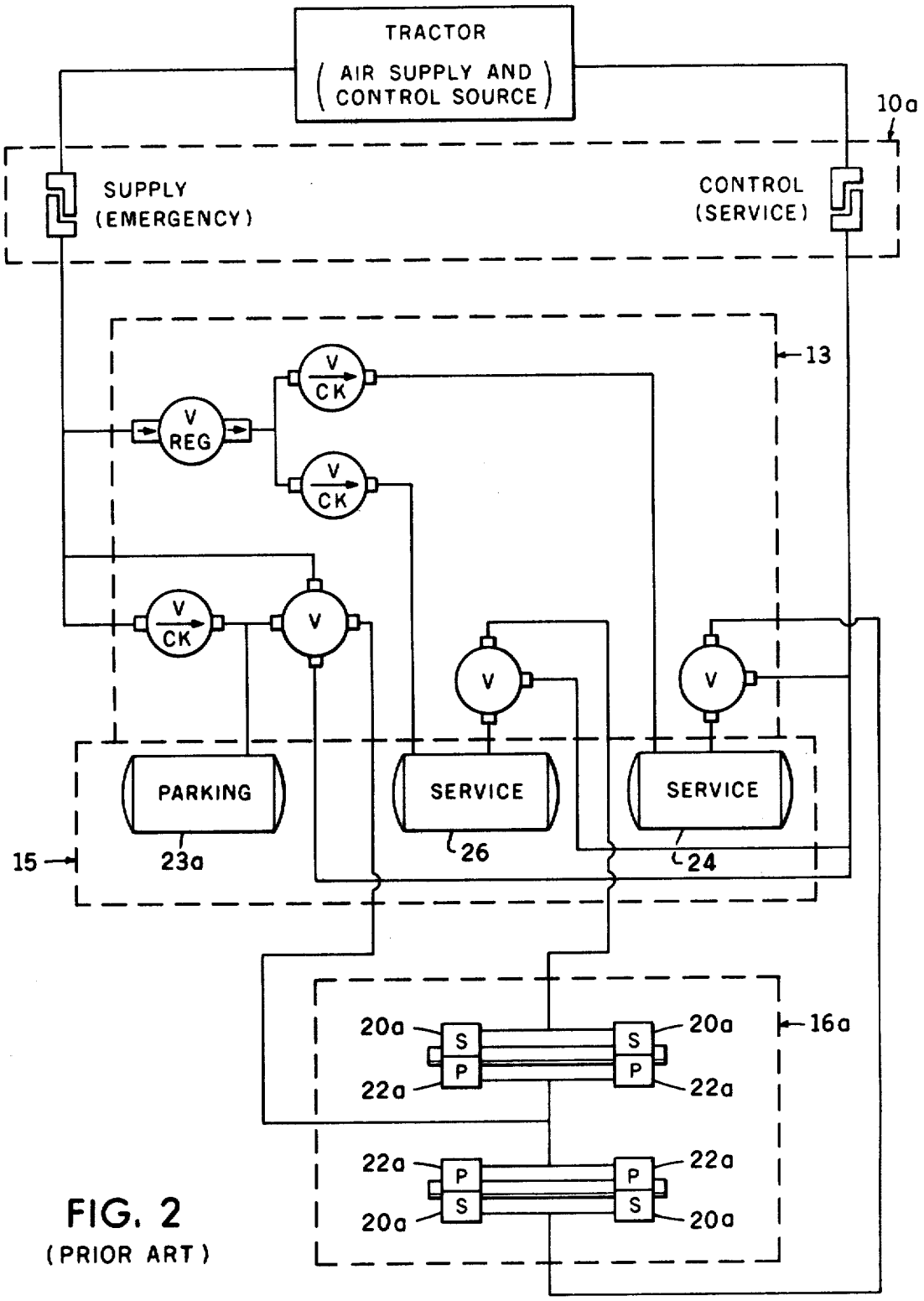
FIG. 2 (PRIOR ART)
FIG. 2 diagrammatically illustrates a prior art tandem axle vehicle brake system utilizing two service reservoirs each communicating air to some of the service brake chambers and one parking reservoir communicating air to all the parking brake chambers.

Referring now to the drawings, it can be seem from the diagram of FIG. 1 that a prior art brake system includes an air receiving portion 10, a valve portion 12, a storage portion 14 and a brake portion 16. Storage portion 14 includes a single service reservoir 18 for providing a source of pressurized air through appropriate valve portion 12 to all the service brake chambers 20 and a single parking reservoir 23 for providing pressurized air to all the parking brake chambers 22. FIG. 2 illustrates another prior art brake system including air receiving portion 10a, valve portion 13, storage portion 15 and brake portion 16a. Storage portion 15 includes service reservoirs 24, 26, each providing a source of air through appropriate valve portion 13 for operating some of the service brake chambers 20a and a single parking reservoir 23a for providing pressurized air to all the parking brake chambers 22a.

Figure 3:
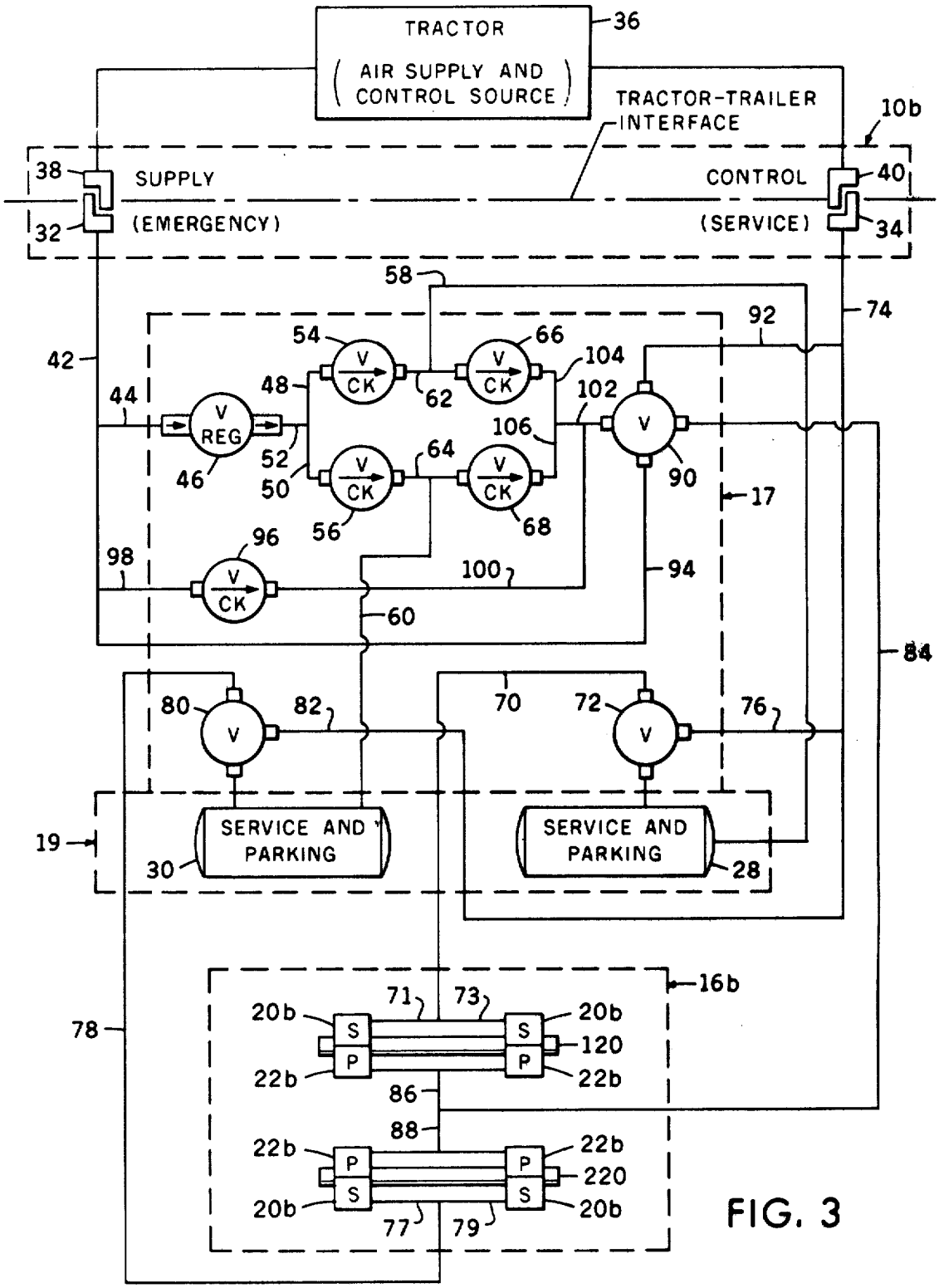
FIG. 3 diagrammatically illustrates the novel tandem axle vehicle brake system of this invention utilizing two reservoirs, each communicating air with some of the service brake chambers and with all of the parking brake chambers.

The novel brake system of this invention, as illustrated in FIG. 3 preferably for mounting on a multi or tendem axle trailer of a tractor-trailer combination, includes an air receiving portion 10b, a valve portion 17, a storage portion 19 and a brake portion 16b. Storage portion 19 includes reservoirs 28, 30. Reservoir 28 provides a source of air through appropriate valve portion 17 for operating some of the service brake chambers 20b on one of the tandem axles 120 and also for providing pressurized air to all the parking brake chambers 22 b. Reservoir 30 provides a source of air through appropriate valve portion 17 for operating others of the service brake chambers 20b on the other of the tandem axles 220 and also for providing pressurized air to all the parking brake chambers 22b on each axle. It can be seen from the foregoing and by referring to the drawings that the valve portions and the storage portions of FIGS. 1, 2 and 3 differ for controlling the air in each system between the air receiving and brake portions.

More particularly now, FIG. 3 includes air receiving portion 10b including means such as gladhand connectors 32, 34 for receiving air from a supply source such as a tractor of a well known tractor-trailer combination and designated 36 in the diagram. Trailer gladhand connectors 32, 34 typically connect with tractor gladhand connectors 38, 40, respectively, at the tractor-trailer interface as is well known. First connector 32 can be connected for receiving supply or emergency air from tractor 36 and second connector 34 can be connected for receiving control or service air from the tractor. Typically, the supply air is the air which passes through storage portion 19 and valve portion 17 and is eventually communicated to the service and parking brake chambers 20b, 22b, respectively, whereas the control air is generally communicated to the valve portion for operating on some of the brake operating valves therein. However, supply air is sometimes used for operating on the brake operating valves as well as being communicated to the brake chambers.

Valve portion 17 is connected to air receiving portion 10b due to conduit 42 connected to first glandhand connector 32. Conduit 44 conducts air from conduit 42 to a pressure guarding means in valve portion 17 such as pressure protection valve 46 for permitting air above a predetermined pressure to pass therethrough. Air passing through valve 46 is conducted to branch conduits 48, 50 via conduit 52. A first plurality of like valve means such as first and second unidirectional or one way check valves 54, 56 are separated for independently receiving air from air receiving portion 10b, for operating on the air received and for securing the air operated on from returning to the air receiving portion. Thus, due to the use of unidirectional valves 54, 56, once air passes therethrough, it is precluded from returning to the air receiving portion from the valve portion.

Storage portion 19 is connected to valve portion 17 and includes a plurality of storage means such as first and second storage reservoirs 28, 30 separated for independently receiving air from valves 54, 56, respectively, and for storing the air received. This is accomplished due to conduits 62, 64, conducting air to conduits 58, 60, respectively, which in turn conduct air to reservoirs 28, 30, respectively. Storage portion 19 may include separate storage tanks or reservoirs 28, 30 as shown, or may include a single tank divided to include separate reservoirs therein.

A second plurality of like valve means, such as third and fourth unidirectional or one way check valves 66, 68, corresponding to valves 54, 56, are separated in the valve portion and are cooperatingly connected to storage reservoirs 28, 30, respectively, for selecting air from either of the reservoirs, for independently operating on the selected air, for securing the selected air from returning to its respective storage reservoir and for securing the selected air from passing to another of the storage reservoirs. This is accomplished due to conduits 58, 60 conducting air from reservoirs 28, 30, respectively. Air is further conducted from conduits 58, 60 to conduits 62, 64, respectively, and thus to valve 66, 68, respectively.

Brake portion 16b includes service brake chambers 20b, some of which are represented as mounted on axle 120 of a tendem axle trailer and connected for receiving air from storage reservoir 28 and others of which are represented as mounted on axle 220 of a tandem axle trailer and connected for receiving air from reservoir 30. This is accomplished due to conduits 70, 71, 73 connecting a first brake operating valve 72 with some of the service brake chambers 20b. Valve 72 is preferably a skid control type valve, well known in the art, connected to receive air from reservoir 28 which air is eventually communicated to some of the service brake chambers 20b via conduits 70, 71, 73 and also connected to receive control air from second gladhand connector 34 via conduits 74, 76, for assisting in operating the valve. Others of the service brake chambers 20b are connected for receiving air from storage reservoir 30. This is accomplished due to conduits 78, 77, 79 connecting a second brake operating valve 80 with the other service brake chambers 20b. Valve 80 is preferably a skid control type valve, similar to valve 72, well known in the art, connected for receiving air from reservoir 30 which air is eventually communicated to the other service brake chambers 20b via conduits 78, 77, 79 and also connected to receive control air from second gladhand connector 34 via conduits 74, 82, for assisting in operating the valve.

The brake portion also includes parking brake chambers 22b some of which are represented as mounted on axle 120 of a tandem axle trailer and others of which are represented as mounted on axle 220 of a tandem axle trailer and connected for receiving the air selected by either of valves 66, 68, from either of the storage reservoirs 28, 30, respectively. This is accomplished due to conduit 84 and branch conduits 86, 88 connecting third brake operating valve 90 with all of the parking brake chambers 22d. Valve 90 is preferably an amplifying relay valve, well known in the art, connected to receive the selected air from either storage reservoir 28, 30, by check valves 66, 68, respectively, which air is eventually communicated to valve 90 via conduits 104, 106, 102. Valve 90 may be connected to receive control air from second gladhand connector 34 via conduits 74, 92 for assisting in operating the valve. However, valve 90 is connected to receive supply air from first gladhand connector 32 via conduits 42, 94 for assisting in operating the valve.

Still further, fifth valve means such as unidirectional or one way check valve 96, corresponding to the first, second, third and fourth check valves 54, 56, 66, and 68, respectively, may be connected between air receiving portion 10b and brake portion 16b for permitting air to bypass pressure protection valve 46 and for conducting air from gladhand connector 32 to valve 90. This is accomplished due to conduit 98 connected to conduit 42 and conduits 100, 102, interconnecting valves 96 and 90.

Figure 4:
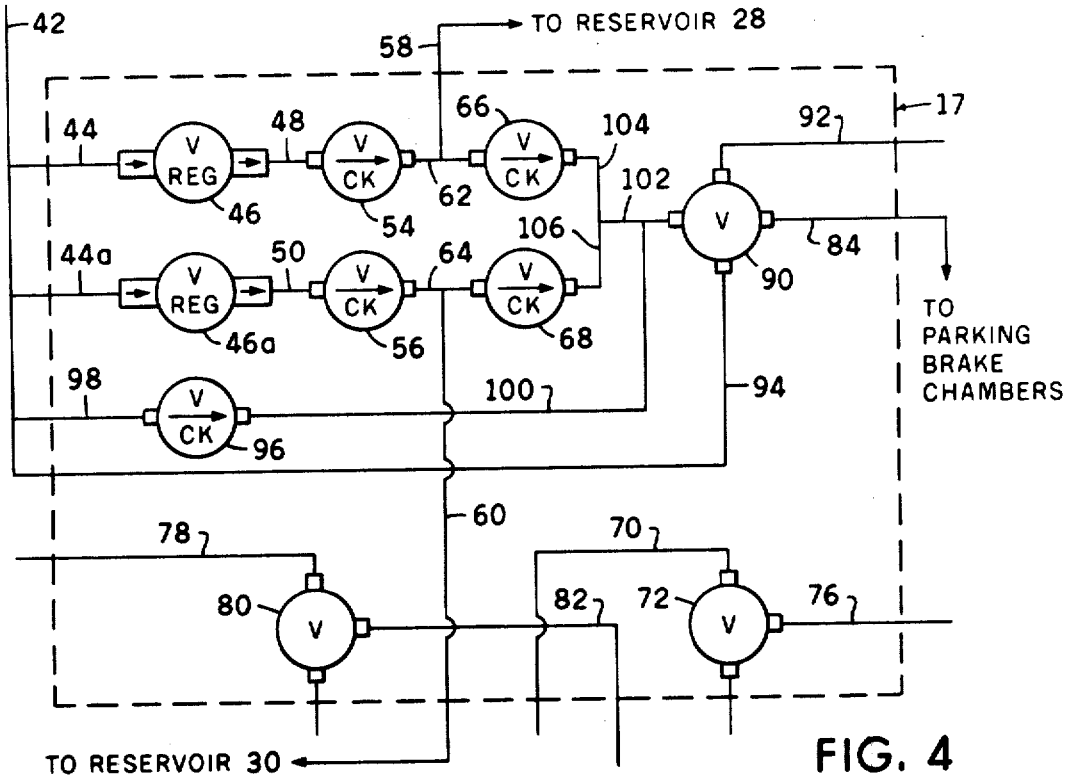
FIG. 4 diagrammatically illustrates an alternative valve portion of the system of FIG. 3.

Alternatively, FIG. 4 illustrates that valve portion 17 of FIG. 3 may include pressure protection valve 46a in addition to pressure protection valve 46. Thus, air is conducted to separate storage reservoirs 28, 30 through separate pressure protection valves 46, 46a, respectively. Air from conduit 42 passes through conduit 44 to pressure protection valve 46, through conduit 48 to check valve 54, thence to reservoir 28. Also, air from conduit 42 passes through conduit 44a to pressure protection valve 46a, through conduit 50 to check valve 56, thence to reservoir 30.

Figure 5:
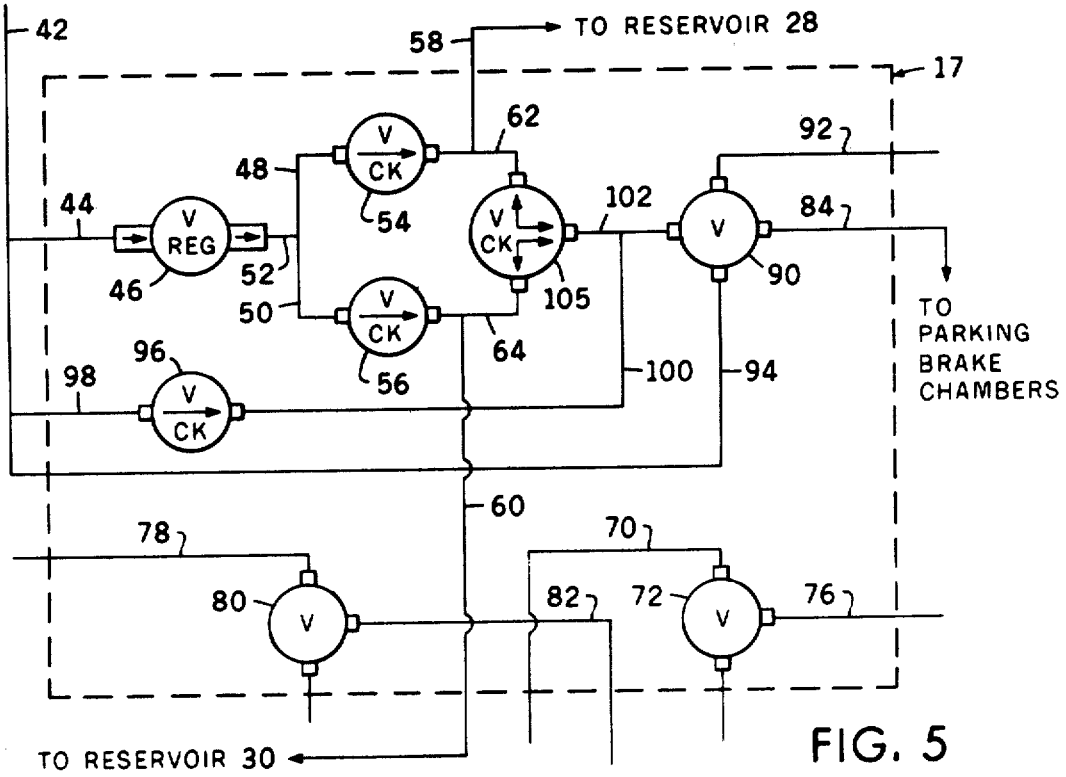
FIG. 5 diagrammatically illustrates another alternative valve portion of the system of FIG. 3.

Alternatively, FIG. 5 illustrates that third and fourth check valves 66, 68 may be replaced by two way check valve 105 in valve portion 17 for interconnecting storage reservoirs 28, 30 and parking brakes 22b via valve 90 and appropriate conduits. This is accomplished due to two way check valve 105 connected for communication with storage reservoir 28 via conduits 58, 62 and connected for communication with valve 90 via conduit 102. Also check valve 105 may be connected for communication with storage reservoir 30 via conduits 60, 64 and connected for communication with valve 90 via conduit 102. Thus, valve 105 is cooperatingly connected to the separated storage reservoirs 28, 30 for selecting air from one of those storage reservoirs and for securing the selected air from passing to another of the storage reservoirs.

OPERATION

In operation, as illustrated in FIG. 3, trailer gladhand collectors 32, 34 are connected to tractor connectors 38, 40 respectively to receive air from tractor 36. Supply air above a predetermined minimum pressure communicates through conduits 42, 44 and opens valve 46 to conduit 52. That air then separates through conduits 48, 50 and passes through check valves 54, 56, respectively, which secure that air from returning to the receiving portion of the system. Once the air is secured by the check valves, it can communicate with storage reservoirs 28, 30 via conduits 58, 60, respectively. Air in the storage reservoir 28 is available for being communicated to some of the service brake chambers 20b via skid control valve 72 and conduits 70, 71 and 73. Air in storage reservoir 30 is available for being communicated to others of the service brake chambers 20b via skid control valve 80 and conduits 78, 77 and 79. Also air of greater pressure in either of storage reservoirs 28, 30 may be selected by either of check valves 66, 68, respectively, and thence communicated to valve 90 for eventual availability to all of the parking brake chambers 22b via conduits 84, 86, 88. Thus, for example, if pressure in reservoir 28 is greater than pressure in reservoir 30, air will be selected from reservoir 28 by valve 66, secured from returning to reservoir 28, and secured from passing through valve 68 to reservoir 30 due to the known functional characteristics of valves 66, 68. Conversely, if pressure in reservoir 30 is greater than pressure in reservoir 28, air will be selected from reservoir 30 by valve 68, secured from returning to reservoir 30 and secured from passing through valve 66 to reservoir 28, as stated before, due to the known functional characteristics of valves 66, 68.

As previously discussed, FIG. 5 illustrates that third and fourth check valves 66, 68 may be alternatively replaced by a single two-way check valve 105. The function of this two-way check valve is similar to the two one-way check valves 66, 68 but does not represent the preferred embodiment. For example, if pressure in reservoir 28 is greater than pressure in reservoir 30, air will be selected from reservoir 28 by valve 105 and may be communicated to valve 90 via conduit 102. The selected air is not secured from returning to storage reservoir 28 as when one-way check valve 66 is used but is secured from passing to storage reservoir 30 due to the well known functional characteristics of valve 105. Conversely, if pressure in reservoir 30 is greater than pressure in reservoir 28, air will be selected from reservoir 30 by valve 105 and may be communicated to valve 90 via conduit 102. The selected air is not secured from returning to storage reservoir 30 as when one-way check valve 68 is used but is secured from passing to storage reservoir 28 due to the known functional characteristics of valve 105. Thus, it can be seen that for example, in the event of loss of air pressure in the service system including storage reservoir 28 and some of the service brake chambers, at least partial braking would be available to others of the service brake chambers through that part of the service system including storage reservoir 30. Further, in the event of loss of air pressure in storage reservoir 28 there would also still be some air pressure communication with the parking brake chambers due to their communication with storage reservoir 30 to prevent automatic application of the parking brakes. Or, for example, in the event of loss of air pressure in the service system including storage reservoir 30 and some of the service brake chambers, at least partial braking would be available to others of the service brake chambers through that part of the service system including storage reservoir 28. Further, in the event of loss of air pressure in the storage reservoir 30 there would also still be some air pressure communication with the parking brake chambers due to their communication with storage reservoir 28 to prevent automatic application of the parking brakes.

The advantage of adding check valve 96 is that it interconnects supply air received at gladhand connector 32 with valve 90 by bypassing pressure protection valve 46 and either check valves 54, 56, 66 and 68 as shown in FIG. 3, or check valves 54, 56 and 105 as shown in FIG. 5. For example, in the event of a failure which depletes air pressure in any one or both of the storage reservoirs, for example, reservoir 28, pressure protection valve 46 will function to limit the reduction of pressure in supply line conduit 42 to a fixed value which may be arbitrarily established at 47 psi. Also if the predetermined minimum opening pressure of valve 46 is 50 psi, then supply line pressure will be insufficient to pass air through valve 46, and, even if air did pass through valve 46, it would go to atmosphere through the failed portion of the system since the air would seek the path of least resistance, or lower pressure. Eventually, cycling of skid control valve 80 can reduce and deplete pressure in reservoir 30. Thus, it would be possible under these conditions for the pressure in both reservoirs 28 and 30 to approach 0 psi despite the existence of usable pressure in supply line conduit 47 at 47 psi. The addition of check valve 96 will permit the 47 psi supply line pressure to have access to amplifying relay valve 90 thus making needed pressure available to release the parking brakes thus providing some braking capability to the vehicle.

The addition of pressure protection valve 46a, FIG. 4, is advantageous since pressure protection valves 46, 46a, although theoretically having the same opening pressure, e.g. 50 psi, do not open at exactly the same pressure. More realistically, one of the valves may open at a lower pressure, for example 49.5 psi, and the other may open at a higher pressure, for example 49.6 psi. Therefore, adding valve 46a may increase the reliability of the system against failure by 50 percent. For example, in the event failure due to loss of air pressure in that portion of the system including reservoir 28 with the portion of the system including reservoir 30 remaining intact and in the event that valve 46 has the higher opening pressure requirement, air from supply line 42 will pass through valve 46a having the lower opening pressure requirement since the air will seek the path of least resistance. Thus, air from supply line 42 will replenish that portion of the system including the intact reservoir 30. Of course, if under the above circumstances, valve 46a has the higher opening pressure requirement, air from supply line 42 will pass through valve 46 and eventually to atmosphere through the failed portion of the system. However, supply air access to the separate reservoirs through pressure protection valves 46, 46a, may increase the reliability of the system.

Even in the two pressure protection valve system of FIG. 4, it would be advantageous to maintain check valve 96 interconnecting supply air conduit 42 and valve 90. For example, in the event of a failure which depletes air pressure in any one or both of the storage reservoirs, for example reservoir 28, pressure protection valves 46, 46a will function to limit the reduction of pressure in supply conduit 42 to a fixed value which may be arbitrarily established at 47 psi. Also, if the predetermined minimum opening pressures of valves 46, 46a are greater than 47 psi then supply line pressure will be sufficient to pass air through the pressure protection valves, and even if it did pass through, for example valve 46a due to that valve having the lower opening pressure requirement, and did pass to the intact portion of the system including reservoir 30, eventually cycling of the skid control valve 80 could reduce and deplete the pressure in reservoir 30. Thus it would be possible under these conditions for the pressure in both reservoirs 28 and 30 to approach 0 psi despite the existence of usable pressure in supply line conduit 42 and 47 psi. The addition of check valve 96 will permit the 47 psi pressure to have access to the amplifying relay valve 90 bypassing pressure protection valves 46, 46a making needed pressure available to release the parking brakes for providing some braking capability of the vehicle.

The foregoing has described a service and parking brake system ofering more than single service reservoir capability to provide at least partial service braking in the event of failure in one of the service systems and also ofering more than single parking reservoir capability so that, in the event of failure in one of the parking reservoirs, there would still be air pressure communication with the parking brakes to prevent the undesirable automatic application of the parking brakes.

Obviously, other modifications and variations of the present invention are possible in the light of the above teachings. It is therefore understood that within the scope of the appended claims the invention may be practiced otherwise than as specifically described.

What is claimed is:

[1. A vehicle brake system comprising:

an air receiving portion including means for receiving air from a supply source;

a valve portion connected to the air receiving portion including a first plurality of one-way check valve means separated for independently operating on the air received and for securing the air operated on from returning to the receiving portion;

a storage portion connected to the valve portion including a plurality of storage means separated for independently receiving the air from the first separated valve means, respectively, and for storing the air received;

a second plurality of one-way check valve means, corresponding to the first valve means, separated in the valve portion and cooperatingly connected to the separated storage means, respectively, for selecting air from one of the storage means, for independently operating on the selected air, for securing the selected air from returning to its respective storage means and for further securing the selected air from paassing to another of the storage means; and a brake portion including service brake means connected for receiving air from the storage means and also including parking brake means connected for receiving the selected air from the storage means.]

[2. The system of claim 1, and further including:

pressure regulating valve means in the valve portion connected between the air receiving portion and the storage portion for permitting air above a predetermined pressure to pass therethrough.]

[3. The system of claim 2, and further including:

brake operating valve means in the valve portion connected for receiving the selected air and for supplying the selected air to the parking brake means.]

4. A vehicle brake system comprising:

an air receiving portion including means for receiving air from a supply source;

a valve portion connected to the air receiving portion including a first plurality of like valve means separated for independently operating on the air received and for securing the air operated on from returning to the receiving portion;

a storage portion connected to the valve portion including a plurality of storage means separated for independently receiving the air from the first separated valve means, respectively, and for storing the air received;

a second plurality of like valve means, corresponding to the first valve means, separated in the valve portion and cooperatingly connected to the separated storage means, respectively, for selecting air from one of the storage means, for independently operating on the selected air, for securing the selected air from returning to its respective storage means and for further securing the selected air from passing to another of the storage means;

a brake portion including service brake means connected for receiving air from the storage means and also including parking brake means connected for receiving the selected air from the storage means;

pressure regulating valve means in the valve portion connected between the air receiving portion and the storage portion ofr permitting air above a predetermined pressure to pass therethrough;

brake operating valve means in the valve portion connected for receiving the selected air and for supplying the selected air to the parking brake means; and further valve means in the valve portion corresponding to the like valve means connected between the air receiving portion and the brake operating valve means bypassing the pressure regulating valve means.

[5. A towed vehicle brake system comprising:

an air receiving portion including means for receiving air from a supply source;

a valve portion connected to the air receiving portion including a plurality of one-way check valve means separated for independently operating on the air received and for securing the air operated on from returning to the receiving portion;

a storage portion connected to the valve portion including a plurality of storage means separated for independently receiving the air from the first separated valve means, respectively, and for storing the air received;

other one-way check valve means in the valve portion cooperatingly connected to the separated storage means for selecting air from one of the storage means and for securing the selected air from passing to another of the storage means; and a brake portion including service brake means connected for receiving air from the storage means and also including parking brake means connected for receiving the selected air from the storage means.]

[6. The system of claim 5, and further including:

pressure regulating valve means in the valve portion connected between the air receiving portion and the storage portion for permitting air above a predetermined pressure to pass therethrough.]

[7. The system of claim 6, and further including:

brake operating valve means in the valve portion connected for receiving the selected air and for supplying the selected air to the parking brake means.]

8. A towed vehicle brake system comprising:

an air receiving portion including means for receiving air from a supply source;

a valve portion connected to the air receiving portion including a plurality of like valve means separated for independently operating on the air received and for securing the air operated on from returning to the receiving portion:

a storage portion connected to the valve portion including a plurality of storage means separated for independently receiving the air from the first separated valve means, respectively, and for storing the air received;

other valve means in the valve portion cooperatingly connected to the separated storage means for selecting air from one of the storage means and for securing the selected air from passing to another of the storage means;

a brake portion including service brake means connected for receiving air from the storage means and also including parking brake means connected for receiving the selected air from the storage means;

pressure regulating valve means in the valve portion connected between the air receiving portion and the storage portion for permitting air above a predetermined pressure to pass therethrough;

brake operating valve means in the valve portion connected for receiving the selected air and for supplying the selected air to the parking brake means; and further valve means in the valve portion corresponding to the like valve means connected between the air receiving portion and the brake operating valve means bypassing the pressure regulating valve means.

[9. A vehicle brake system comprising:

an air receiving portion including means for receiving air from a supply source;

a valve portion connected to the air receiving portion including a first plurality of one-way check valve means separated for independently operating on the air received and for securing the air operated on from returning to the receiving portion;

a storage portion connected to the valve portion including a plurality of storage means separated for independently receiving the air from the first separated valve means, respectively, and for storing the air received;

a second plurality of one-way check valve means, corresponding to the first valve means, separated in the valve portion and cooperatingly connected to the separated storage means, respectively, for selecting air from one of the storage means, for independently operating on the selected air, for securing the selected air from returning to its respective storage means and for further securing the selected air from passing to another of the storage means; and a brake portion including service brake means, ones of the service brake means connected for receiving air from one of the storage means, another of the service brake means connected for receiving air from another of the storage means and also including parking brake means connected for receiving the selected air from the storage means.]

[10. A vehicle brake system comprising:

an air receiving portion including first and second means for receiving air from a supply source;

a valve portion connected to the air receiving portion including first and second one-way check valve means separately connected for unidirectionally passing air there-through from the first ar receiving means;

a storage portion connected to the valve portion including first and second storage means separately connected for receiving air from the first and second valve means, respectively, and for storing the air received;

third and fourth one-way check valve means, corresponding to the first and second valve means, separately and cooperatingly connected to the first and second storage means, respectively, for selecting air from one of the storage means, for unidrectionally passing the selected air there-through, for securing the selected air from returning to its respective storage means and for further securing the selected air from passing to the other of the storage means; and a brake portion including service brake means, ones of the service brake means connected for receiving air from the first storage means, others of the service brake means connected for receiving air from the second storage means and also including parking brake means connected for receiving the selected air from the storage means.]

[11. The system of claim 10, and further including:

pressure regulating valve means in the valve portion connected between the first means for receiving ar and the storage portion for permitting air above a predetermined pressure to pass therethrough.]

[12. The system of claim 11, and further including:

brake operating valve means in the valve portion connected for receiving the selected air and for supplying the selected air to the parking brake means.]

13. A vehicle brake system comprising:

an air receiving portion including first and second means for receiving air from a supply source;

a valve portion connected to the air receiving portion including first and second like valve means separately connected for unidirectionally passing air therethough from the first air receiving means;

a storage portion connected to the valve portion including first and second storage means separately connected for receiving air from the first and second like valve means, respectively, and for storing the air received;

third and fourth like valve means, corresonding to the first and second valve means, separately and cooperatingly connected to the first and second storage means, respectively, for selecting air from one of the storage means, for unidirectionally passing the selected air therethrough, for securing the selected air from returning to its respective storage means and for further securing the selected air from passing to the other of the storage means;

a brake portion including service brake means, ones of the service brake means connected for receiving air from the first storage means, others of the service brake means connected for receiving air from the second storage means and also including parking brake means connected for receiving the selected air from the storage means;

pressure regulating valve means in the valve portion connected between the first means for receiving air and the storage portion for permitting air above a predetermined pressure to pass therethrough;

brake operating valve means in the valve portion connected for receiving the selected air and for supplying the selected air to the parking brake means; and fifth valve means in the valve portion corresponding to the like valve means connected between the first means for receiving air and the brake operating valve means bypassing the pressure regulating valve means.

[14. A towed vehicle brake system comprising:

an air receiving portion including first and second means for receiving air from a supply source;

a valve portion connected to the air receiving portion including first and second one-way check valve means separately connected for unidirectionally passing air therethrough from the first air receiving means;

a storage portion connected to the valve portion including first and second storage means separately connected for receiving air from the first and second valve means, respectively, and for storing the air received;

other one-way check valve means in the valve portiion cooperatingly connected to the first and second storage means for selecting air from one of the storage means and for securing the selected air from passing to the other of the storage means; and a brake portion including service brake means, ones of the srvice brake means connected for receiving air from the first storage means, others of the service brake means connected for receiving air from the second storage means and also including parking brake means connected for receiving the selected air from the storage means.]

[15. The system of claim 14, and further including:

pressure regulating valve means in the valve portion connected between the first air receiving means and the first and second storage means for permitting air above a predetermined pressure to pass therethrough.]

[16. The system of claim 15, and further including:

brake operating valve means in the valve portion connected for receiving the selected air and for supplying the selected air to the parking brake means.]

17. A towed vehicle brake system comprising:

an air receiving portion including first and second means for receiving air from a supply source;

a valve portion connected to the air receiving portion including first and second like valve means separately connected for unidirectionally passing air therethrough from the first air receiving means;

a storage portion connected to the valve portion including first and second storage means separately connected for receiving air from the first and second like valve means, respectively, and for storing the air received;

other valve means in the valve portion cooperatingly connected to the first and second storage means for selecting air from one of the storage means and for securing the selected air from passing to the other of the storage means;

a brake portion including service brake means, ones of the srvice brake means connected for receiving air from the first storage means, others of the service brake means connected for receiving air from the second storage means and also including parking brake means connected for receiving the selected air from the storage means;

pressure regulating valve means in the valve portion connected between the first air receiving means and the first and second storage means for permitting air above a predetermined pressure to pass therethrough;

brake operating valve means in the valve portion connected for receiving the selected air and for supplying the selected air to the parking brake means; and further valve means in the valve portion corresponding to the like valve means connected between the first means for receiving air and the brake operating valve means bypassing the pressure regulating valve means.

[18. A vehicle service and parking brake system comprising:

first and second air receiving means for receiving air from a supply source;

first and second air storage means connected for receiving air from the first air receiving means;

first and second unidirectional valve means connected to the first air receiving means for permitting air to pass therethrough to the first and second storage means, respectively;

first and second brake operating valve means connected for receiving air from the first and second storage means, respectively, and for supplying air from the storage means to the service brake means, third and fourth unidirectional valve means connected to the first and second storage means, respectively, cooperating for selecting air from one of the storage means and for securing the selected air from passing to the other of the storage means; and third brake operating valve means connected for receiving the selected air, and for supplying the selected air to the parking brakes.]

[19. A vehicle service and parking brake system comprising:

first and second air receiving means for receiving air from a supply source;

first and second air storage means connected for receiving air from the first air receiving means;

pressure regulating valve means connected between the first air receiving means and the first and second air storage means for permitting air above a predetermined pressure to pass therethrough;

first and second unidirectional valve means connected to the first air receiving means for permitting air to pass therethrough to the first and second storage means, respectively;

first and second brake operating valve means connected for receiving air from the first and second storage means, respectively, for receiving air from the second air receiving means and for supplying air from the storage means to the service brake means;

third and fourth unidirectional valve means connected to the first and second storage means, respectively, cooperating for selecting air from one of the storage means and for securing the selected air from passing to the other of the storage means; and third brake operating valve means connected for receiving the selected air and for supplying the selected air to the parking brake means.]

[20. The system of claim 19, and further including:

fifth unidirectional valve means in the valve portion connected for passing air therethrough from the first air receiving means to the third brake operating valve means bypassing the pressure regulating valve means.]

*21. A vehicle service and parking brake system comprising:*

*first and second air receiving means for receiving air from a supply source;*

*first and second air storage means connected for receiving air from the first air receiving means;*

*pressure regulating valve means connected between the first air receiving means and the first and second air storage means for permitting air above a predetermined pressure to pass therethrough;*

*first and second unidirectional valve means connected to the first air receiving means for permitting air to pass therethrough to the first and second storage means, respectively;*

*first and second brake operating valve means connected for receiving air from the first and second storage means, respectively, for receiving air from the second air receiving means and for supplying air from the storage means to the service brake means;*

*third and fourth unidirectional valve means connected to the first and second storage means, respectively, cooperating for selecting air from one of the storage means and for securing the selected air from passing to the other of the storage means;*

*third brake operating valve means connected for receiving the selected air and for supplying the selected air to the parking brake means; and*

*fifth unidirectional valve means in the valve portion connected for passing air therethrough from the first air receiving means to the third brake operating valve means bypassing the pressure regulating valve means.*

* * * * *